(12) United States Patent
Sharpe

(10) Patent No.: US 6,938,579 B2
(45) Date of Patent: Sep. 6, 2005

(54) PET TOILET

(76) Inventor: William R. Sharpe, 61 Edgewater Drive, Stoney Creek, ON (CA) L8E 4Z2

(*) Notice: Subject to any disclaimer, the term of this patent is extended or adjusted under 35 U.S.C. 154(b) by 0 days.

(21) Appl. No.: 10/775,106

(22) Filed: Feb. 11, 2004

(65) Prior Publication Data

US 2005/0172907 A1 Aug. 11, 2005

(51) Int. Cl.[7] .............................................. A01K 1/01
(52) U.S. Cl. ..................................................... 119/163
(58) Field of Search ........................ 119/163, 164, 165, 119/161; 4/302, 313, 662, 420.4, 446, 256.1, 4/378, 405, 249, 321, 323

(56) References Cited

U.S. PATENT DOCUMENTS

| | | | |
|---|---|---|---|
| 2,204,416 A * | 6/1940 | Kramer .................... 119/163 |
| 3,227,138 A * | 1/1966 | Campbell ................. 119/163 |
| 3,734,057 A | 5/1973 | Lee et al. |
| 3,842,803 A | 10/1974 | Temel |
| 3,964,437 A | 6/1976 | Brown |
| 4,011,836 A * | 3/1977 | Temel ..................... 119/163 |
| 4,117,555 A | 10/1978 | Dennis |
| 4,228,554 A | 10/1980 | Tumminaro |
| 4,271,544 A * | 6/1981 | Hammond .................. 4/661 |
| 4,660,506 A | 4/1987 | Nalven |
| 4,729,342 A | 3/1988 | Loctin |
| 5,148,771 A | 9/1992 | Schuett et al. |
| 5,289,799 A | 3/1994 | Wilson |
| 5,477,812 A | 12/1995 | Waters |
| 5,494,001 A | 2/1996 | Leibowitz |
| 5,662,066 A * | 9/1997 | Reitz ..................... 119/163 |
| 5,755,181 A | 5/1998 | Petkovski |
| 5,791,288 A | 8/1998 | Ehrler |
| 5,924,141 A | 7/1999 | Fransson |
| 5,996,533 A | 12/1999 | Gordon |
| 6,176,201 B1 | 1/2001 | Fields |
| 6,371,050 B1 | 4/2002 | Mochizuki |
| 6,453,844 B1 | 9/2002 | Janzen et al. |
| 6,457,435 B1 | 10/2002 | Bridges |
| 6,463,881 B1 * | 10/2002 | Reitz ..................... 119/163 |
| 6,561,131 B1 | 5/2003 | Schwartz |
| 6,615,765 B1 | 9/2003 | Thomas |

\* cited by examiner

*Primary Examiner*—Yvonne R. Abbott
(74) *Attorney, Agent, or Firm*—McFadden, Fincham

(57) ABSTRACT

A pet toilet suitable for use indoors, including a housing having electronic sensors built within the walls of the housing, which in operation, the electronic sensors are adapted to determine the ingress and egress of a pet, after which the sensors automatically relay a signal to flush the housing via conventional household drains. The drain of the housing is covered by a moveable drain cover or plate controllable by the sensors. The pet toilet further includes water and electricity supply lines and feeds such water and electricity through suitable water distribution and electronic distribution lines which are within the walls of the housing.

17 Claims, 2 Drawing Sheets

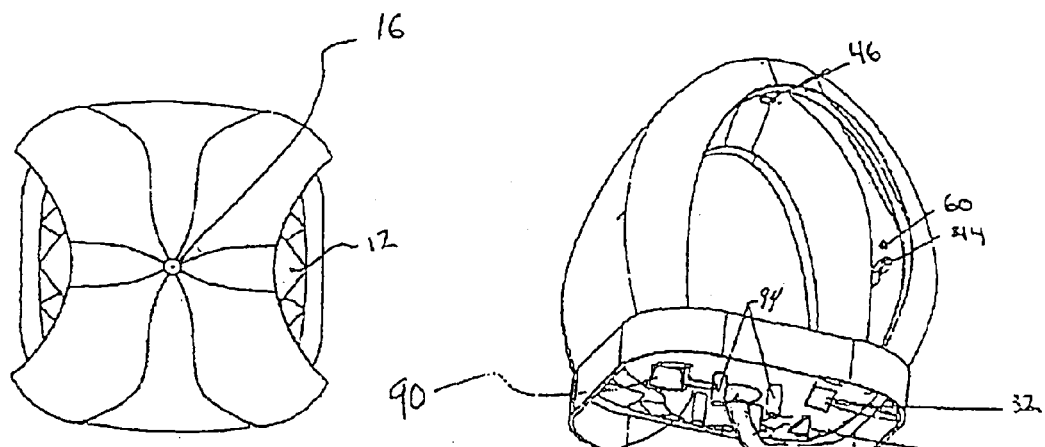
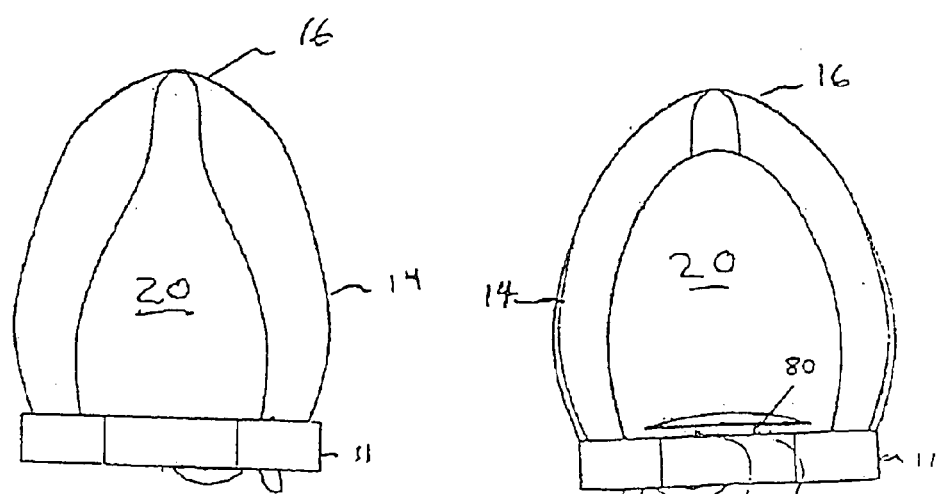

PET TOILET

FIELD OF THE INVENTION

The present invention relates to a pet toilet, and more specifically, to a toilet for use by a household pet (particularly dogs), whereby such a pet toilet automatically activates for flushing after use by actions of the pet upon exit from the housing.

BACKGROUND OF THE INVENTION

There have been various attempts in the prior art to develop a suitable device for use as a pet toilet. For example, U.S. Pat. No. 2,204,416 discloses an animal toilet that flushes when an animal moves from one chamber to another within the toilet structure itself. The animal toilet flushes via a tilter board.

U.S. Pat. No. 3,811,410, discloses an animal toilet including sensor means which detects the animals entrance to the toilet and then flushes after a pre-determined time via a timing device.

U.S. Pat. No. 6,457,435, discloses a pet toilet comprising a housing, electronic means to sense the entry and exit of a pet, and a removable floor including a series of drain holes configured within the removable floor to drain to the center of the housings bottom.

SUMMARY OF THE INVENTION

The present invention is directed to a pet toilet including enclosed structure having a pair of openings therein for the pet to enter and exit. The structure includes a housing including having a pair of openings, bottom, parallel side walls, tapering into a top portion connecting the parallel side walls. The housing includes at least one nozzle mounted at the top of the structure to spray water in a downward direction onto the bottom of the housing. The housing also includes at least one nozzle mounted on at least one side of the parallel side walls for providing a flushing action to remove any waste thereon. The housing also includes at least one nozzle mounted to one of the parallel side walls, adapted to release a mist or spray of ammonia. Further the invention includes at least one electronic sensing means, for example a photo cell or other suitable detection device to determine the ingress and egress of an animal.

In a pet toilet including a housing having opposed walls, an entrance and an exit into and out of the housing, a base in the housing, means for dispensing liquid into the interior of the enclosure to cleanse the walls and the base, and a discharge system adapted to dispose solid and liquid animal waste from the base, the improvement wherein the discharge system includes a movable member in the base movable between an open position and a closed position, and means for moving the movable member between the open and the closed positions to permit discharge of animal waste from the base when the movable member is in the open position.

A pet toilet comprising a housing including a base, an entrance and an exit, and opposed side walls, a flushing system including at least one water nozzle mounted by the housing adapted to spray water onto the base of the housing, at least one other water nozzle mounted to spray the side walls, a sensing means adapted to detect the ingress and egress of an animal into the housing, a drainage outlet in the base, a movable drain cover member movable between upper and lower positions and operatively associated with the drainage outlet, means for moving the drain cover member between the upper and lower positions, and the means for moving the drain cover member being in operative association with the sensing means whereby when the sensing means detects the egress of an animal from the housing, the sensing means is effective to actuate the means for moving the drain cover member and to actuate the flush system.

BRIEF DESCRIPTION OF THE DRAWINGS

The present invention will be more fully understood by reference to following in which:

FIG. 3 is a side view of the pet toilet illustrated in FIG. 1;

FIG. 4 is a side view of the pet toilet as illustrated in FIG. 3, with drain cover shown in an activated position;

FIG. 5 is an elevational view of the bottom of the structure illustrated in FIG. 1; and FIG. 6 is a top down view of FIG. 1.

DETAILED DESCRIPTION OF THE PREFERRED EMBODIMENTS

The drawings disclose a preferred embodiment of the present invention. While the embodiment illustrated is preferred, it is envisioned that various modifications and present invention may be adopted without deviating from the invention as disclosed.

Figure 1:
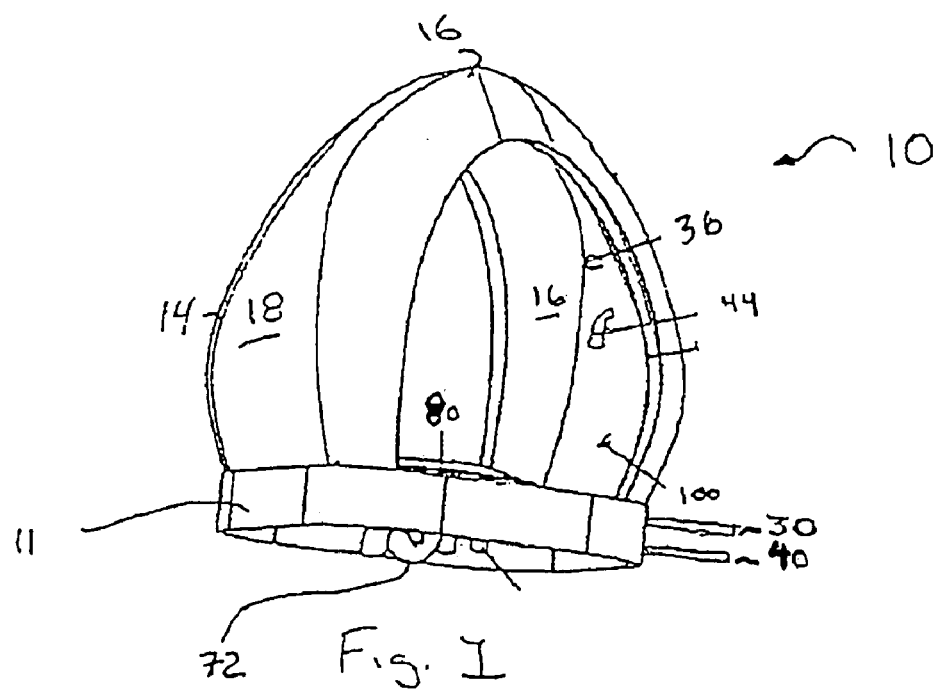
FIG. 1 is the side perspective view illustrating one embodiment of a pet toilet according to the present invention.
Figure 2:
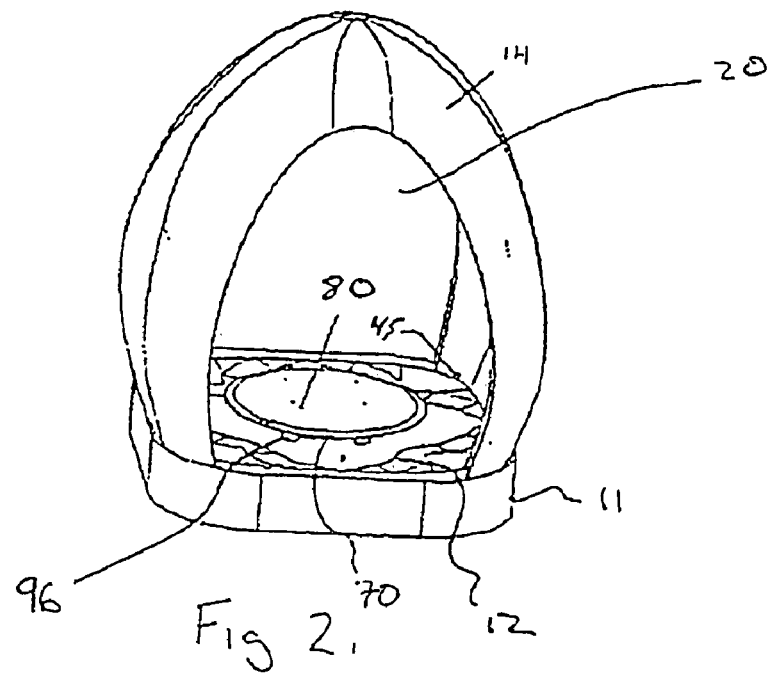
FIG. 2 is a front view of the pet toilet illustrated in FIG. 1.

With reference to FIG. 1, there is illustrated a pet toilet having a housing generally indicated by reference numeral 10. Housing 10 is adapted through shape and configuration to accept many variations in the size of pets, and is particularly suited to dogs, although other animals may be trained to use the present invention. The housing 10 is preferably made of molded fiberglass for strength and sanitation, although other materials may be used.

The housing 10 includes a base 11 having a floor member 12, and parallel side walls 14 extending generally upwardly from the base member 12 and tapering inwardly to terminate at a top or upper portion 16. The floor member 12 is preferably configured to drain fluids and or waste into the center of the floor 12. The side walls 14 include inner and outer surfaces 16 and 18, respectively. The housing 10 further includes a pair of opposed openings 20 for pet ingress and egress from the housing 10.

The housing 10 includes electrical and water source connection lines, generally indicated by reference numerals 30 and 40, which are adapted to be connected to corresponding existing supply sources of electricity and water (including sewage or drainage lines) from the user's residence or business.

The housing 10, as illustrated, is approximately 3' in length, 3' in width and approximately 4' in height and include suitable electronics, generally indicated by reference number 32, for providing electrical power to the housing 10 in order to operate various electrical components therein. As one skilled in the art will understand, the aforementioned dimensions are for exemplary purposes only and may vary depending on the intended or desired final product. For example, the pet toilet of the present invention may include a light source 36 mounted within the housing 10, to illuminate the interior for use by a pet of the housing 10 at night or when there is little or inadequate lighting. As illustrated, the light source is positioned at an upper portion of the interior wall, although other suitable locations may be desired, for example, mounted near or on the entry and or exit, built into interior housing walls, et cetera.

Connected to the water source line 40 are water lines 42, which are preferably embedded or otherwise located within the parallel side walls 14. As illustrated, the water distribution lines 42 embedded within the parallel walls 14 are connected via suitable pipes or tubes, to permit water from the water supply source or line 40, suitably connected to a pump 41, to feed or supply water to the nozzles 44 (or other suitable openings) in the parallel walls 14. The water therefrom being adapted to rinse the interior portion or surface 16 of the walls 14 within the housing 10 when sprayed from the nozzles once the animal has used the pet toilet and exited the housing 10. Located at an upper portion of the interior of the housing 10 is another water nozzle 46 (illustrated in FIG. 5), adapted to rinse or spray the base or floor member 12 from above once the animal has utilized the pet toilet and left the housing 10. This is described in further detail below. Located at a location on the interior portion of the side walls 14 proximate the floor 12, there is provided a plurality of nozzles or jets 45 connected to water supply source. Nozzles or jets 45 are adapted to circulate the water under pressure about the floor 12 to force any waste down the drain 70. The housing 10 further includes electronic sensors or sensing means generally indicated by reference numeral 60, supplied by or connected to electrical power source 32. Sensors 60 may include photo sensors or cells, or other suitable means known in the art. The sensors are adapted to detect the presence (for example the ingress and egress) of an animal or pet within the housing. As illustrated, sensors or sensing means 60 may be located within the housing 10 at convenient or suitable locations, for example at or near the openings 20.

The housing 10 includes in the base or floor member 12 a drain member 70. Preferably, drain member 70 is located at the center of the base or floor member 12, being configured or manufactured such that the floor member 12 slopes or otherwise tapers to the center thereof to allow fluids to drain into the center. The drain 70 is adapted to be connected to an existing or conventional household plumbing or sewage system via member 72 so that the housing 10 may be operated and cleaned without moving the housing 10 to a separate area for discharging or removing animal waste.

As illustrated, the drain 70 is covered with a movable drain cover 80. Cover 80, in a preferred embodiment, is of a contoured dish shape, adapted to correspond to the shape of the floor 12. Cover 80 may be manufactured or coated with Teflon, plastic or other suitable material that deters biological or animal waste material from sticking thereto. Cover 80 is adapted to be raised and lowered once the animal has exited from the housing 10. Cover 80, in the present embodiment, is suitable coupled or connected via a motor or other power source 90, which is adapted to raise the cover 80 above the drain 70. The cover 80 is raised, upon actuation of the motor, or for example using city water pressure through a series of valves to provide the same process, to allow the rinsing or flushing of the pet's waste to and through the drain 70 once the pet has vacated the housing 10. Additional water pressure may be provided through additional pumps or suitable means adapted to increase or decrease water pressure throughout the structure.

More particularly, as illustrated in FIGS. 4 and 5, the cover 80 is connected to a motor 90, or, city water pressure with a series of valves, which is connected to a hydraulic valve 92, which in turn is connected to hydraulic lift cylinders 94 and connected to lift cylinder rods 96. When the motor or city water pressure with a series of valves, is actuated, the hydraulic valve 92 actuates the lift cylinders 94 to raise the rods 96 to effect upward movement of the cover 80. Such upward or vertical movement need only raise the cover 80 to a point above the floor such that any waste may be evacuated by the rinsing and spraying action of the water nozzles 44 and 46 respectively. After the flush or rinsing of the water from the nozzles to effect waste removal and the washing of the sides 14 and floor 12, the motor 90 permits the cover 80 to return to a covering position over the drain 70.

Alternatively, in the present invention the cover 80 may be raised using water pressure instead of a hydraulic motor. Water from the supply source may be adapted, under pressure, to lift or raise the cover 80. Once the flush or rinse cycle has been completed, the cover 80 would return to a position over the drain.

As illustrated, there is provided a scent or other similar discharge member 100, mounted or embedded in the side walls 14. Discharge member 100 may be in the form of mist sprayer or nozzle, such that a small amount of a scent, such as ammonia, may be sprayed or atomized into the interior of the housing.

According to a preferred embodiment, in operation the sensors 60, for example are active and emitting an infrared light beam. A pet enters the housing via one of the openings 20 at either end of the housing 10. Upon entering the housing 10, a light beam is broken or reflected back into the electronic sensing detection devices whereby the light beam is transformed into a low voltage electrical signal. Once the sensors 60 activate, the circuit of such electronic sensor or detection means 60 are in a hold position for as long as the pet or animal remains in the housing 10. Once the animal has utilized the pet toilet and has exited the housing 10, the electronic sensor or detection means 60 detects such egress and cause an electronic signal to be initiated to energize the flushing or spraying of the interior of housing 10. The water is sprayed or otherwise permitted to exit the nozzles 44, 45 and 46 to rinse the walls 14 and floor 12 respectively.

Nozzle 46 connected to the water supply source 40 via lines 42 operates in conjunction with the wall mounted nozzles 44 to spray down from the elevated position to help clean and effect removal of the pet's waste. As illustrated, water nozzles 44 are positioned within the walls 14 and are positioned at a determined location, in this example approximately halfway up the interior wall 16, such that the water sprays or flows therefrom out of the plurality of openings to distribute water down the inside of the parallel walls so as to flow down to the floor or base member 12. Nozzles or jets 45 help rinse by circulating under pressure water and any waste material into the drain. The drain 70 in the floor 12 is of a suitable size to accept and permit waste for drainage to the sewage system.

The circuitry of the electronic detection devices 60 automatically controls the motor to actuate the hydraulic cylinders and rods to lift the cover to allow the water and animal waste to enter the drain 70, as well as the pump 41.

Thereafter, the circuit of the electronic detection sensor automatically resets the unit for the next use.

As noted above, the sensor means 60 operate on a detection system, which ensures that the pet toilet of the present invention will only actuate upon the entry and exit of the pet: As contemplated in the present invention, upon ingress by the pet into the housing 10, the photo cell detects such ingress and activates the start of the cycle, and only upon the detection of the egress of the pet, does the system or process continue. For example, a delay of a specified time (i.e. 30 seconds or more) after detection of the egress of the animal the circuits would actuate the flushing or washing of the interior of the housing 10 would commence. Immediately after which (or just prior to the cessation of the spraying) the drain cover 80 would open to allow drainage of the waste, then close for subsequent use. In addition, if the animal enters during such a flush cycle, the circuitry will register such ingress of an animal or pet and immediately stop all operations until the egress of the animal is detected, after which the circuitry permits the process to continue, for example after the predetermined or specified time has lapsed.

Although preferred embodiments of the invention have been described above, it is not limited thereto and it will be apparent to those skilled in the art that numerous modifications form part of the present invention insofar as they do not depart from the spirit or scope of the invention as defined in the accompanying claims.

I claim:

1. A pet toilet comprising:
   a) a housing including a base, an entrance and an exit, and opposed side walls;
   b) a flushing system including at least one water nozzle mounted by said housing adapted to spray water onto the base of said housing;
   c) at least one other water nozzle mounted to spray said side walls;
   d) a sensing means adapted to detect the ingress and egress of an animal into said housing;
   e) a drainage outlet in said base;
   f) a movable drain cover member movable between upper and lower positions and operatively associated with said drainage outlet;
   g) means for moving said drain cover member between said upper and lower positions;
   h) said means for moving said drain cover member being in operative association with said sensing means whereby when said sensing means detects the egress of an animal from said housing, said sensing means is effective to actuate said means for moving said drain cover member and to actuate said flush system; and
   i) wherein said housing has a pair of opposed side walls tapering into a top portion connecting all of said opposed walls, said housing having an entrance and an exit therein.

2. The apparatus of claim 1, wherein said means for moving said drain cover member comprises hydraulic means to elevate said drain cover member whereby animal waste may be removed from said base by the flushing action of said flush system.

3. The apparatus of claim 1, wherein said sensing means is operatively associated with said flush system and said means for actuating said drain cover member, said sensing system including circuit means operatively associated therewith for receiving and sending signals to said flush system and said means for actuating said drain cover member.

4. The apparatus of claim 1, wherein said drainage cover member is adapted to move above the plane of said base.

5. The apparatus of claim 1, wherein said drainage outlet is adapted to be connected to a residential drainage system.

6. A pet toilet comprising:
   a) a housing including a base, an entrance and an exit, and opposed side walls;
   b) a flushing system including at least one water nozzle mounted by said housing adapted to spray water onto the base of said housing;
   c) at least one other water nozzle mounted to spray said side walls;
   d) a sensing means adapted to detect the ingress and egress of an animal into said housing;
   e) a drainage outlet in said base;
   f) a movable drain cover member movable between upper and lower positions and operatively associated with said drainage outlet;
   g) means for moving said drain cover member between said upper and lower positions;
   h) said means for moving said drain cover member being in operative association with said sensing means whereby when said sensing means detects the egress of an animal from said housing, said sensing means is effective to actuate said means for moving said drain cover member and to actuate said flush system, and
   i) wherein said flush system includes a chamber beneath said drainage outlet for receiving animal waste, and at least one nozzle for dispensing water in a generally circular motion in said chamber.

7. The apparatus of claim 6, wherein said means for moving said drain cover member comprises hydraulic means to elevate said drain cover member whereby animal waste may be removed from said base by the flushing action of said flush system.

8. The apparatus of claim 6, wherein said housing has a pair of opposed side walls tapering into a top portion connecting all of said opposed walls, said housing having forming an entrance and an exit therein.

9. The apparatus of claim 6, wherein said sensing means is operatively associated with said flush system and said means for actuating said drain cover member, said sensing system including circuit means operatively associated therewith for receiving and sending signals to said flush system and said means for actuating said drain cover member.

10. The apparatus of claim 6, wherein said drainage cover member is adapted to move above the plane of said base.

11. The apparatus of claim 6, wherein said drainage outlet is adapted to be connected to a residential drainage system.

12. In a pet toilet including a housing having opposed walls, an entrance and an exit into and out of said housing, a base in said housing, means for dispensing liquid into the interior of said enclosure to cleanse said walls and said base, a flush system for flushing waste from said base, and a discharge system adapted to remove solid and liquid animal waste from said base upon flushing of the flush system,
   the improvement wherein said discharge system includes a movable member in said base movable between an open position and a closed position, and means for moving said movable member between said open and said closed positions to permit discharge of animal waste from said base when said movable member is in said open position, and
   wherein said flush system includes a chamber beneath a drainage outlet for receiving animal waste, and at least one nozzle for dispensing water in a generally circular motion in said chamber.

13. The apparatus of claim 12, wherein said means for moving said drain cover member comprises hydraulic means to elevate said drain cover member whereby animal waste may be removed from said base by the flushing action of said flush system.

14. The apparatus of claim 12, wherein said housing has a pair of opposed side walls tapering into a top portion connecting all of said opposed walls, said housing having an entrance and an exit therein.

15. The apparatus of claim 12, wherein the apparatus includes a movable drain cover movable between upper and lower positions together with means for moving said drain cover between said upper and lower positions, said drain cover being operatively associated with a drainage outlet, said apparatus further including sensing means operatively associated with said flush system and said means for actuating said drain cover member, said sensing system including circuit means operatively associated therewith for receiving and sending signals to said flush system and said means for actuating said drain cover member.

16. The apparatus of claim 15, wherein said drainage cover member is adapted to move above the plane of said base.

17. The apparatus of claim 15, wherein said drainage outlet is adapted to be connected to a residential drainage system.

* * * * *